(12) United States Patent
Chen

(10) Patent No.: US 7,110,787 B2
(45) Date of Patent: Sep. 19, 2006

(54) FIXING APPARATUS USED TO HOLD A DIGITAL PHOTOGRAPHY MODULE ON A MOBILE TELEPHONE

(75) Inventor: Ming-Pin Chen, Taipei (TW)

(73) Assignee: Arima Communications Corp., Taipei (TW)

( * ) Notice: Subject to any disclaimer, the term of this patent is extended or adjusted under 35 U.S.C. 154(b) by 572 days.

(21) Appl. No.: 10/645,280

(22) Filed: Aug. 21, 2003

(65) Prior Publication Data

US 2005/0043058 A1    Feb. 24, 2005

(51) Int. Cl.
*H04B 1/38* (2006.01)
*H04M 1/00* (2006.01)

(52) U.S. Cl. .............................. 455/550.1; 455/575.1; 455/90.3; 379/433.11

(58) Field of Classification Search ............. 455/550.1, 455/575.1, 90.3, 66.1, 344, 899; 379/433.11, 379/433.12
See application file for complete search history.

(56) References Cited

U.S. PATENT DOCUMENTS

| 6,466,747 B1* | 10/2002 | Tanaka | ........................ 396/543 |
| 2003/0036365 A1* | 2/2003 | Kuroda | ........................ 455/90 |

* cited by examiner

*Primary Examiner*—Tilahun Gesesse
(74) *Attorney, Agent, or Firm*—Birch, Stewart, Kolasch & Birch, LLP

(57) ABSTRACT

A structure of a shielding case is changed into a fixing apparatus for holding a digital photography module on a mobile telephone. A first component of the fixing apparatus has several folded sides. These folded sides are used to fix the horizontal movement of the digital photography module. A second component of the fixing apparatus has at least one engagement portion. The engagement portion is used to fix the vertical movement of the digital photography module.

15 Claims, 2 Drawing Sheets

FIXING APPARATUS USED TO HOLD A DIGITAL PHOTOGRAPHY MODULE ON A MOBILE TELEPHONE

BACKGROUND OF THE INVENTION

1. Field of Invention

The present invention relates to a portable electronic device. More particularly, the present invention relates to a fixing apparatus.

2. Description of Related Art

Mobile telephones are portable and wireless telephone devices installed on conveyances, such as vehicles and ships, or carried on someone's person. Mobile telephones are different from extensions of the telephone or long distance radio transceivers. Mobile telephones provide users with the same functions of immobile telephones as well as the greater convenience of mobility. By cooperating with international direct dialing, mobile telephone users can communicate with any other person in the world in an available range of a mobile telephone system.

Following the great progress of the communication bandwidth, the color panel and the digital photography module, more and more mobile telephones are configured with digital modules thereon to provide users further with video support. A mobile telephone user can use a built-in digital photography module of a mobile telephone to take pictures or record videos anytime and anywhere, and then transmits the pictures or videos by the mobile telephone to a remote receiver who can then get the firsthand information.

FIG. 1 illustrates a schematic view of a mobile telephone with a built-in digital photography module. A mobile telephone 100 includes a digital photography module 102 on a case surface 104 thereof. A user can use the digital photography module 102 to take pictures or record videos. For good photography effect, the digital photography module 102 usually needs to be fixed in an immovable position to prevent the pictures or videos taken thereby from being out of focus due to shaking.

A convention fixing way is use an additional plastic element to fix the position of the digital photography module 102 on the mobile telephone 100. However, considering the electromagnetic interference, a conductive lacquer needs to be spread on surfaces of the plastic element to prevent electromagnetic waves from passing through the plastic element to damage electronic elements inside the mobile telephone 100. If the conductive lacquer on the plastic element falls out, the electromagnetic protection function thereof is destroyed. Moreover, because the plastic element is an additional element, it may become loose and unable to fix the digital photography module 102 securely. Therefore, the convention fixing way using the plastic element to fix and protect the digital photography module 102 is unstable and uneconomical.

SUMMARY OF THE INVENTION

It is therefore an objective of the present invention to provide a fixing apparatus that satisfies the need to solve conventional problems, such as easily becoming loose and additional costs, of using an additional plastic element to fix a digital photography module on a portable electronic device.

In accordance with the foregoing and other objectives of the present invention, a fixing apparatus is described. A configuration of an existing shielding case is changed to be a fixing apparatus of the invention for fixing a digital photography module. The fixing apparatus and the changed shielding case comprise two components. A first component of the fixing apparatus includes several folded sides. These folded sides are used to fix a horizontal movement of the digital photography module. A second component of the fixing apparatus includes at least one engagement portion. The engagement portion is used to fix a vertical movement of the digital photography module. These two components are combined to fix the digital photography module, thus preventing the digital photography module from moving in three horizontal and vertical directions.

In one preferred embodiment of the present inventions, materials of the two components of the invention are metal, and usually are copper, aluminum, copper alloy, alloy aluminum or combinations thereof. The fixing apparatus thus has both functions of securing the digital photography module and electromagnetic shielding.

The first component includes a frame body, and the invention provides several folded sides around an opening of the frame body. These folded sides extend from the sides of the first opening and are bent with a predetermined angle. The predetermined angle is 90 degrees. A shape of the opening is substantially the same as a shape of a control circuit board of the digital photography module, and a size of the opening is also substantially the same as a size of the control circuit board.

The second component includes a plane body, and is coupled upon the first component. The plane body has an opening for the camera lens to pass through. By this combination of the first component and the second component, the fixing apparatus can be a shielding case to shield electromagnetic interference outside to the mobile telephone and the built-in digital photography module thereof. The invention provides at least one engagement portion around the opening of the second component. The engagement portion is of a predetermined thickness.

The folded sides, the opening and the frame body of the first component are integrally formed by stamping one metal sheet. And the engagement portion, the opening, and the plane body of the second component are also integrally formed by stamping another metal sheet.

Furthermore, the invention further provides a cushion placed between the engagement portion and the control circuit board where in contact with the engagement portion. The cushion makes the engagement portion compress tightly to fix the control circuit board. A material of the cushion is rubber.

In conclusion, the fixing apparatus of the invention not only provides an electromagnetic shielding, but also fixes the digital photography module. The invention is easy to install, cheap, and practical. The invention also enhances product values without much added cost. In addition, besides mobile telephones, the invention also can be applied in other portable electronic devices with digital photography modules, such as personal digital assistants, to fix the digital photography modules and prevent electromagnetic interference.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
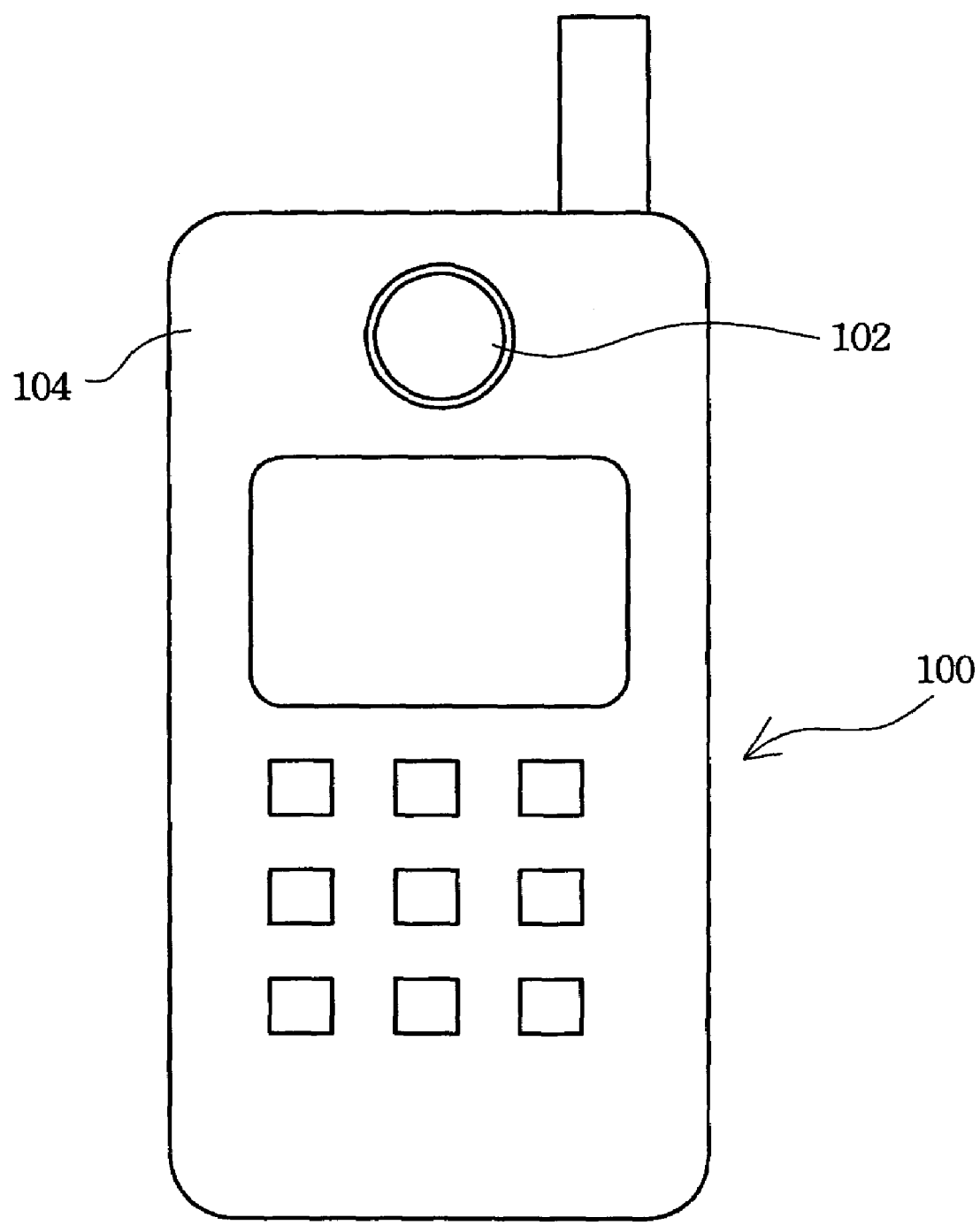
FIG. 1 is a schematic view of a conventional mobile telephone with a built-in digital photography module.

Reference will now be made in detail to the present preferred embodiments of the invention, examples of which are illustrated in the accompanying drawings. Wherever possible, the same reference numbers are used in the drawings and the description to refer to the same or like parts.

The present invention provides a fixing apparatus to solve conventional problems, such as easily becoming loose and additional costs, of using an additional plastic element to fix a digital photography module on a portable electronic device.

The portable electronic device mentioned here has a digital photography module, and usually is a light and handy electronic device, such as a mobile telephone or a personal digital assistant (PDA).

A configuration of an existing shielding case is changed to be a fixing apparatus of the invention for fixing a digital photography module. The fixing apparatus, the changed shielding case, comprises two components. A first component of the fixing apparatus includes several folded sides. These folded sides are used to fix a horizontal movement of the digital photography module. A second component of the fixing apparatus includes at least one engagement portion. The engagement portion is used to fix a vertical movement of the digital photography module.

These two components are combined to fix the digital photography module, thus immobilizing the digital photography module in three horizontal and vertical directions. Moreover, materials of the two components of the invention are metal, usually copper, aluminum, copper alloy, aluminum alloy or combinations thereof, so the fixing apparatus has both functions of fixing the digital photography module and electromagnetic shielding.

Figure 2C:
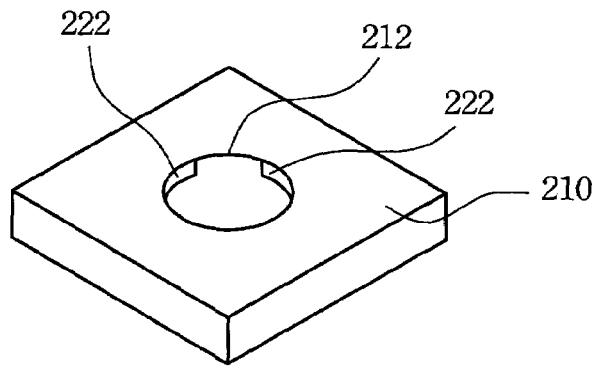
FIG. 2C is a schematic view of a second component according to one preferred embodiment of this invention.
Figure 2B:
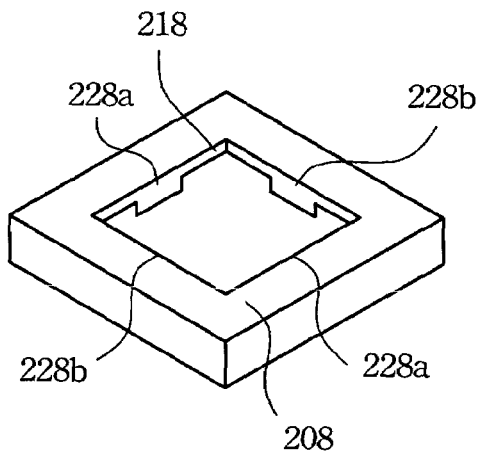
FIG. 2B is a schematic view of a first component according to one preferred embodiment of this invention.
Figure 2A:
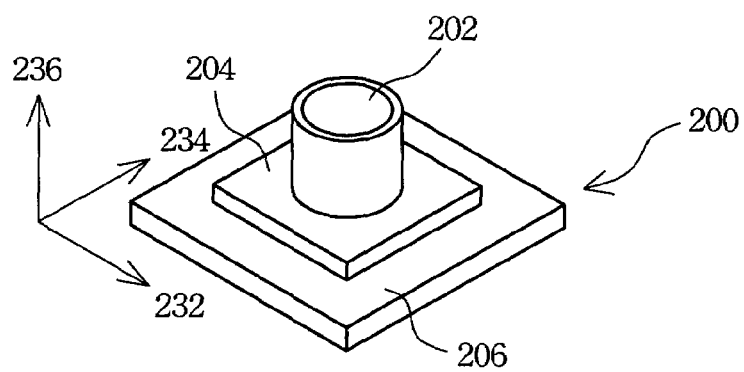
FIG. 2A is a schematic view of a digital photography module according to one preferred embodiment of this invention.

FIG. 2A illustrates a schematic view of a digital photography module in one preferred embodiment of the invention. The digital photography module 200 includes a camera lens 202 and a control circuit board 204 for controlling the camera lens 202. For the following explanation, three directions 232, 234 and 236 are defined as illustrated in FIG. 2A. The three directions 232, 234 and 236 are perpendicular to one another, and a plane formed by the directions 232 and 234 is parallel to the control circuit board 204, and the camera lens 202 is coupled with the control circuit board 204 along the direction 236.

FIG. 2B illustrates a schematic view of a first component of the preferred embodiment of the invention. The first component 208 includes a frame body, and the invention provides several folded sides 228a and 228b around an opening 218 of the frame body. These folded sides 228a and 228b extend from the sides of the first opening 218 and are bent with a predetermined angle. In this preferred embodiment, the predetermined angle is 90 degrees, a shape of the opening 218 is substantially the same as a shape of the control circuit board 204, and a size of the opening 218 is also substantially the same as a size of the control circuit board 204. Moreover, the folded sides 228a and 228b, the opening 218 and the frame body of the first component 208 are integrally formed by stamping a metal sheet.

The foregoing folded sides can be divided into two parts in two different directions. In FIG. 2B, the shape of the opening 218 is square, and the folded sides 228a are on the two sides of the opening 218 in the direction 232. The folded sides 228b are on the other two sides of the opening 218 in the direction 234. By this configuration, the folded sides 228a and 228b simultaneously fix movements in the directions 232 and 234 of the control circuit board 204, and therefore make sure the whole digital photography module 200 does not move in the plane formed by the directions 232 and 234.

However, the predetermined angle between the folded sides and the opening is variable, and is not necessarily 90 degrees. Moreover, the shape and the size of the opening also do not need to be the same as those of the control circuit board. Further, the invention does not need a folded side on every sides of the opening, and folded sides can be selectively added to some sides of the opening. People skilled in the art can consider design necessities to change the predetermined angle, or the shape and the size of the opening of the invention. It is noted that after these changes, the folded sides of the invention must still be able to fix the horizontal movement of the control circuit board.

In another embodiment, the shape of the opening 218 can be an octagon, and the size thereof is larger than the size of the control circuit board 204. Four sides of the octagon have folded sides, and one side with the folded side is separated from another side with the folded side by one side without the folded side. The predetermined angle is less than 90 degrees; in other words, every folded side is not perpendicular to the frame body, so one end of every folded sided is used to shore up the control circuit board to eliminate all horizontal movement. If the dimension of the end of the folded side is too small to shore up the control circuit board, a supporting side can be added onto the end of the folded side to enlarge the dimension that contacts the control circuit board. The horizontal movement of the digital photograph module is therefore also fixed, in keeping with the spirit of the invention.

FIG. 2C illustrates a schematic view of a second component of the preferred embodiment of the invention. The second component 210 includes a plane body, and is coupled upon the first component 208. The plane body has an opening 212 for the camera lens 202 to pass through. By this combination of the first component 208 and the second component 210, the fixing apparatus can be a shielding case to shield electromagnetic interference outside the mobile telephone and the built-in digital photography module thereof. The invention provides at least one engagement portion 222 around the opening 212 of the second component 210. The engagement portion 222 is of a predetermined thickness. When the first component 208 is coupled with the second component 210, the engagement portion 222 with the predetermined thickness shores up the control circuit board 204 to immobilize the control circuit board in direction 236.

In this preferred embodiment, the engagement portion 222 is a thick piece, and the engagement portion 222, the opening 212, and the plane body of the second component 210 are integrally formed by stamping a metal sheet. Moreover, a plastic case encloses the digital photography module 200; in other words, the camera lens 202 and the control circuit board 204 are enclosed in the plastic case to protect electronic and optical elements therein. The engagement portion 222 therefore can directly contact the plastic case outside the control circuit board 204 to prevent movement in direction 236 of the digital photography module 200.

Several considerations are necessary in the design of the fixing apparatus of the invention. First, the size of the opening 218 of the first component 208 must be large enough to allow engagement portion 222 of the second component 210 to pass therethrough. The engagement portion 222 thus can pass through the opening 218 to press onto the control circuit board 204 or the plastic case thereof.

Moreover, a device circuit board 206 usually is coupled with another side of the control circuit board 208 opposite the camera lens 202. The device circuit board 206 is a main circuit board of the portable electronic device, and for a mobile telephone, the device circuit board 206 is a circuit board in charge of all operation of the mobile telephone. The device circuit board includes many electronic elements thereon and wires between the electronic elements, so even a little damage to the device circuit board may break the electronic elements or short the wires, which would then hinder the normal operation of the portable electronic device.

The folded sides 228a and 228b of the first component 208 are used to fix the control circuit board 204, and generally are in contact with the edges of the control circuit board 204. If the lengths of the folded sides 228a and 228b are too long, the folded sides 228a and 228b may scrape the device circuit board 206 below and tightly contacting the control circuit board 204. Therefore, a predetermined distance between the folded sides 228a/228b and the device circuit board 206 is preserved when the fixing apparatus is designed to prevent the folded sides from damaging the device circuit board 206. In one preferred embodiment of the invention, the predetermined distance is about 0.5 mm.

Furthermore, the invention further provides a cushion placed between the engagement portion 222 and the control circuit board 204 where contacting the engagement portion 222. The cushion makes the engagement portion compress tightly to fix the control circuit board 204. In one preferred embodiment of the invention, a material of the cushion is rubber. The rubber has features of elasticity and water resistance to provide a good buffer between the engagement portion 222 and the control circuit board 204.

In conclusion, the fixing apparatus of the invention not only provides an electromagnetic shielding, but also fixes the digital photography module. The invention is easy to install, cheap, and practical. The invention also enhances product values without much additional cost. In addition, besides mobile telephones, the invention also can be applied in other portable electronic devices with digital photography modules, such as personal digital assistants, to fix the digital photography modules and prevent electromagnetic interference.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fixing apparatus, used to hold a digital photography module on a case surface of a portable electronic device, the case surface being defined as a plane, a normal direction of the plane being defined as a first direction, the digital photography module having a camera lens and a first circuit board, and the first circuit board connected with the camera lens along the first direction, the fixing apparatus comprising:
    a first component including a frame body, the frame body including a first opening, a plurality of folded sides extending from sides of the first opening and being bent with a predetermined angle; and
    a second component including a plane body, the plane body including a second opening and at least one engagement portion, the engagement portion being in a predetermined thickness and configured around the second opening;
    wherein the second component is coupled with the first component in the first direction, and the camera lens sequentially passes through the first opening and the second opening to protrude from the case surface, the folded sides prevent horizontal movement parallel to the plane of the first circuit board, and the engagement portion prevents vertical movement in the first direction of the first circuit board, thus immobilizing the digital photography module on the case surface of the portable electronic device by the fixing apparatus.

2. The fixing apparatus of claim 1, wherein the portable electronic device is a mobile telephone or a personal digital assistant (PDA).

3. The fixing apparatus of claim 1, wherein materials of the first component and the second component are metal to shield the portable electronic device from electromagnetic interference outside.

4. The fixing apparatus of claim 1, wherein materials of the first component and the second component are copper, aluminum, copper alloy, aluminum alloy, or combinations thereof to shield the portable electronic device from external electromagnetic interference.

5. The fixing apparatus of claim 1, wherein the portable electronic device further comprises a second circuit board, the second circuit board is coupled with another side of the first circuit board opposite the camera lens in the first direction, and a predetermined distance exists between the folded sides and the second circuit board to prevent the folded sides from damaging the second circuit board.

6. The fixing apparatus of claim 1, wherein the predetermined distance is about 0.5 mm.

7. The fixing apparatus of claim 1, wherein a plastic case encloses the first circuit board, and the engagement portion directly contacts the plastic case to prevent vertical movement in the first direction of the first circuit board.

8. The fixing apparatus of claim 1, wherein the folded sides, the first opening and the frame body are integrally formed by stamping a metal sheet.

9. The fixing apparatus of claim 1, wherein the engagement portion, the second opening and the plane body are integrally formed by stamping a metal sheet.

10. The fixing apparatus of claim 1, wherein the fixing apparatus further comprises a cushion placed between the engagement portion and the first circuit board, and the engagement portion compresses tightly to fix the first circuit board.

11. The fixing apparatus of claim 10, wherein a material of the cushion is rubber.

12. The fixing apparatus of claim 1, wherein arrangement directions of the folded sides are divided into a second direction and a third direction parallel to the plane, and the second direction is perpendicular to the third direction, and the folded sides in the second direction and the third direction prevent horizontal movement parallel to the plane of the first circuit board.

13. The fixing apparatus of claim 1, wherein the predetermined angle is about 90 degrees.

14. The fixing apparatus of claim 1, wherein a shape of the second opening and a shape of the camera lens are identical.

15. The fixing apparatus of claim 1, wherein a side of the first opening is large enough for the engagement portion to pass therethrough, thus compressing the engagement portion tightly to fix the first circuit board.

* * * * *